United States Patent
Celozzi et al.

(10) Patent No.: US 12,483,896 B2
(45) Date of Patent: Nov. 25, 2025

(54) METHOD IN A TELECOMMUNICATION NETWORK, AND COMPUTER SYSTEM

(71) Applicant: Telefonaktiebolaget LM Ericsson (publ), Stockholm (SE)

(72) Inventors: Giuseppe Celozzi, Naples (IT); Pietro Picaro, Formia (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 241 days.

(21) Appl. No.: 18/267,300

(22) PCT Filed: Dec. 16, 2020

(86) PCT No.: PCT/EP2020/086574
§ 371 (c)(1),
(2) Date: Jun. 14, 2023

(87) PCT Pub. No.: WO2022/128089
PCT Pub. Date: Jun. 23, 2022

(65) Prior Publication Data
US 2024/0056824 A1 Feb. 15, 2024

(51) Int. Cl.
*H04W 12/80* (2021.01)
*H04L 9/40* (2022.01)

(52) U.S. Cl.
CPC .......... *H04W 12/80* (2021.01); *H04L 63/20* (2013.01)

(58) Field of Classification Search
CPC ............................. H04W 12/80; H04L 63/20
USPC .......................................................... 726/1
See application file for complete search history.

(56) References Cited

PUBLICATIONS

"Lawful Interception (LI); Interface for warrant information, Dec. 2002, ETSI, V1.12.1, pp. 10-23" (Year: 2022).*
International Search Report and Written Opinion issued in International Application No. PCT/EP2020/086574 dated Sep. 2, 2021 (14 pages).
ETSI TS 103 221-1 V1.7.1 (Aug. 2020), "Lawful Interception (LI); Internal Network Interfaces; Part 1: X1," Aug. 2020 (44 pages).
ETSI GS QKD 004 V1.2.3 (Jan. 2019), "Quantum Key Distribution; Application interface," Jan. 2019 (23 pages).
ETSI TS 103 221-2 V1.3.1 (Aug. 2020), "Lawful Interception (LI); Internal Network Interfaces; Part 2: X2/X3," Aug. 2020 (29 pages).
ITU-T Y.3800, Telecommunication Standardization Sector of ITU, "Series: Global Information Infrastructure, Internet Protocol Aspects, Next-Generation Networks, Internet of Things and Smart Cities," Oct. 2019 (22 pages).

(Continued)

*Primary Examiner* — Michael S McNally
(74) *Attorney, Agent, or Firm* — Rothwell, Figg, Ernst & Manbeck, P.C.

(57) ABSTRACT

A lawful interception administrative function, LI ADMF, (108) in a telecommunication network (100) obtains from a quantum key distribution network, QKDN, (10) a quantum key and a key stream identifier, KSID, associated with the quantum key. The LI ADMF (108) transmits the KSID associated with the quantum key to an LI entity (107, 136) in the telecommunication network (100). The LI entity (107, 136) then obtains, from the QKDN (10), a quantum key associated with the KSID transmitted by the LI ADMF (108). Such a procedure provides a secure exchange of quantum keys to enable encryption of sensitive data within messages exchanged by LI entities in the telecommunication network (100).

19 Claims, 6 Drawing Sheets

(56) References Cited

PUBLICATIONS

Quantum Key Distribution (QKD) in OpenSSL, A report describing how we implemented OKD for OpenSSL during the RIP Quantum Internet Hackathon 2019, Nov. 2019 (15 pages).
Lucamarini, M. et al., ETSI White Paper No. 27, "Implementation Security of Quantum Cryptography Introduction, challenges, solutions," First edition—Jul. 2018 ISBN No. 979-92620-21-4 (28 pages).
ETSI GS QKD 004 V1.1.1 (Dec. 2010), "Quantum Key Distribution (QKD); Application Interface," Dec. 2010 (19 pages).

* cited by examiner

METHOD IN A TELECOMMUNICATION NETWORK, AND COMPUTER SYSTEM

CROSS REFERENCE TO RELATED APPLICATIONS

This application is a 35 U.S.C. § 371 National Stage of International Patent Application No. PCT/EP2020/086574, filed 2020 Dec. 16.

TECHNICAL FIELD

The disclosure herein relates to a method performed in a telecommunication network, a corresponding computer system as well as a computer program and a carrier of such a computer program.

BACKGROUND

Lawful interception (LI) of traffic between communicating entities in a telecommunication network involves interaction between several functions in a core network that is part of the telecommunication network. For the purpose of the present disclosure, it is enough to mention a few functions such as an LI administrative function (ADMF), a network element (NE) and a law enforcement monitoring facility (LEMF) at a law enforcement agency (LEA). As will be exemplified further in the detailed description below, a NE in the present context is an entity in the core network that is involved in the communication activity that is subject to LI.

Communication between entities in the telecommunication network, in a LI context, is subject to various standards in the form of technical specifications (TS) set by the European Telecommunications Standards Institute (ETSI). According ETSI TS 103 221-1 V1.7.1, messages pertaining to tasks are transmitted between an ADMF and a NE via an X1 interface, e.g. activate, modify and deactivate task. Commands are transmitted using a message structure specified in ETSI TS 103 221-1 V1.7.1 and the NE responds to the ADMF with a response message also specified in ETSI TS 103 221-1 V1.7.1. During LI, a point of interception (POI) in the NE transmits, via X2 and X3 interfaces, interception data as a stream of X2/X3 protocol data units (PDU) to the MF according to ETSI TS 103 221-2 V1.3.1. According ETSI TS 103 120 V1.7.1, messages pertaining to, e.g., targets are transmitted between an ADMF and a LEMF via an HI-1 interface.

Needless to say, the content of messages transmitted between the ADMF, the NE and the LEMF must be considered to be of a sensitive nature and it is therefore of vital importance that such communication is protected against unauthorized access. Prior art protection of the content of communication between the ADMF, the NE and the LEMF typically involve the use of protection mechanisms that operate at the transport layer used by the LI entities. This means that the protection mechanism is decided and controlled "outside" of the LI context and therefore not specified in the LI standard specifications.

SUMMARY

In view of the above, an object of the present disclosure is to improve security in a telecommunication network, in particular between an ADMF and other LI entities in the telecommunication network. This object is achieved in a first aspect by a method performed in a telecommunication network.

The method of the first aspect comprises obtaining, by a LI ADMF from a quantum key distribution network (QKDN), a quantum key and a key stream identifier (KSID) associated with the quantum key. The ADMF transmits the KSID associated with the quantum key to an LI entity in the telecommunication network. The LI entity then obtains, from the QKDN, a quantum key associated with the KSID transmitted by the ADMF.

In other words, a method is provided that uses highly secure keys exchanged using QKD keys to enable encryption of sensitive data within messages exchanged by LI entities in a telecommunication network. As will be exemplified, the method provides for exchange of the QKD keys as part of a standard protocol. This is in contrast to prior art solutions wherein encryption is a part of an underlying transport layer communication. The QKD keys exchanged according to the method herein may be used to encrypt at least specific parts of the messages exchanged between the LI entities, for example messages pertaining to the targets of LI, which are the most sensitive messages and should therefore be hidden. The method herein may replace any previous encryption of parts of messages communicated between LI entities in a telecommunication network.

An advantage of the method of the first aspect is that it secures traffic data in transit between LI entities from eavesdropping. Data encrypted using QKD keys guarantees a very high level of protection from eavesdropping. Two parties, given access to an insecure quantum and classical channel, can securely establish a secret key without making any assumptions about the capabilities of an eavesdropper who might be present. This is because the principles of quantum mechanics ensure that no eavesdropper can successfully measure the quantum state being transmitted without disturbing the state in some detectable way.

Moreover, an advantage of the method of the first aspect is that it enables configurability of the security level of communication links between the LI entities. QKD can be enforced as a matter of choice, in place of the default key exchange mechanism used in prior art methods. Another advantage that the method of the first aspect provides is that it enables abstraction from the underlying specific QKD technology.

The LI entity may in some embodiments be an NE in the telecommunication network. The transmission, by the ADMF to the NE, of the KSID associated with the quantum key may then be performed via an X1 interface as specified by the ETSI in TS 103 221-1. For example, the transmission may take place in an ActivateTaskRequest message and the KSID may be a mandatory field among the TaskDetails in the ActivateTaskRequest message.

The LI entity may in some embodiments be an LEMF in the telecommunication network. The transmission, by the ADMF to the LEMF, of the KSID associated with the quantum key may then be performed via an HI-1 interface as specified by the ETSI in TS 103 120. For example, the transmission may take place in an action request message and the KSID may be a mandatory field in the action request message.

Some embodiments comprise transmitting, by the ADMF to the LI entity, a message comprising a query whether or not the LI entity is capable of obtaining a quantum key from the QKDN. The LI entity then determines that the LI entity is capable of obtaining a quantum key from the QKDN and transmits, to the ADMF, a response comprising information that specifies that the LI entity is capable of obtaining a quantum key from the QKDN. The obtaining of a quantum key and a KSID associated with the quantum key by the ADMF from the QKDN is then performed as a consequence of the reception, by the ADMF from the second entity, of the information that specifies that the LI entity is capable of obtaining a quantum key from the QKDN. Such capability negotiation between the LI entities may in various embodiments be realized via the X1 and HI-1 interfaces as will be exemplified in more detail below.

In a further aspect, there is provided a computer system comprising a processor and a memory, said memory containing instructions executable by said processor whereby said computer system is operative to perform a method as summarized above.

In yet a further aspect, there is provided a computer program comprising instructions which, when executed on at least one processor in a computer system, cause the computer system to carry out a method as summarized above.

In yet a further aspect, there is provided a carrier, comprising the computer program as summarized above, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
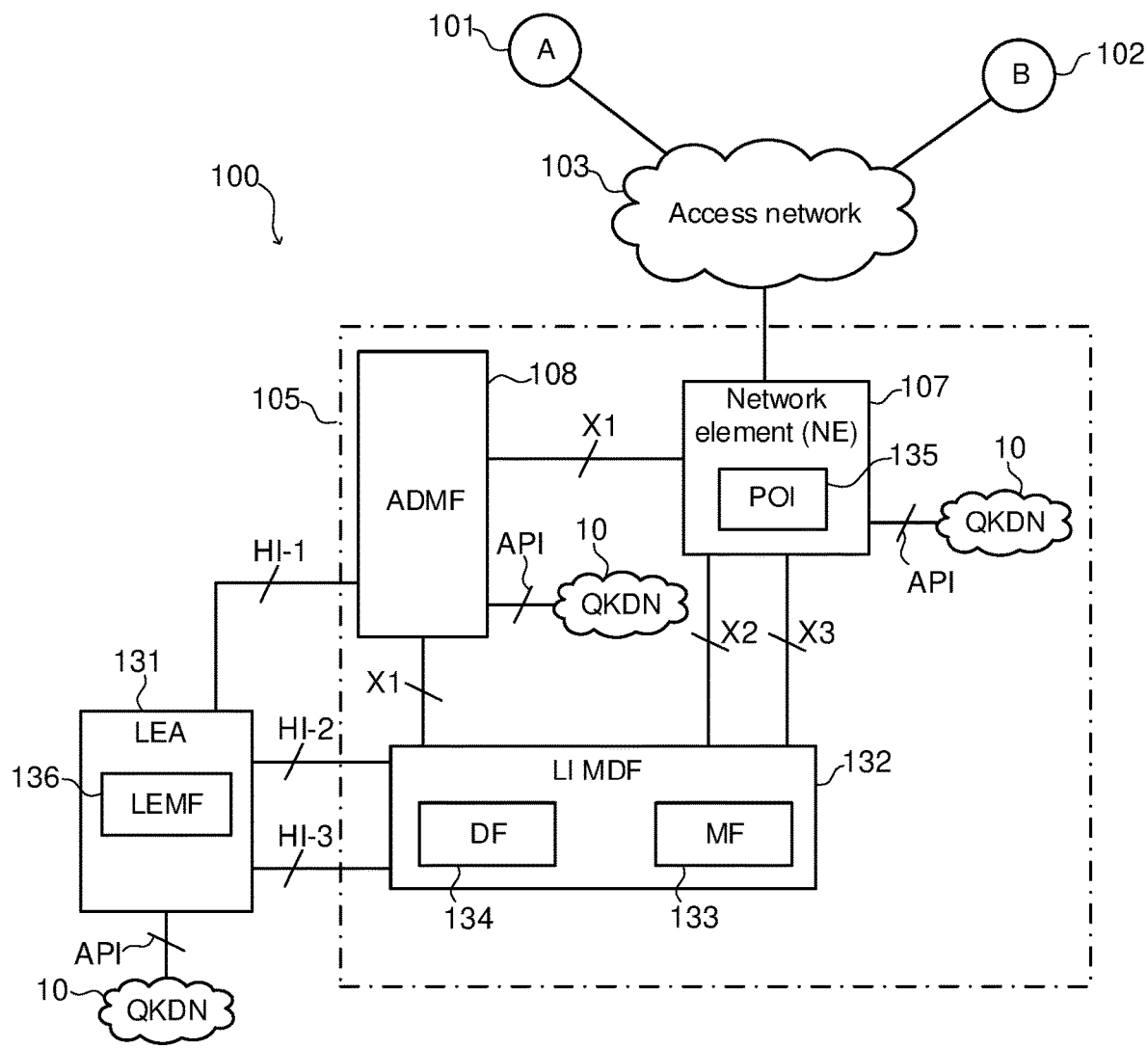
FIGS. 1 *a-b* are schematically illustrated block diagrams of LI systems.

FIG. 1*a* schematically illustrates a first functional representation of a telecommunication network 100 comprising a core network 105 and an access network 103 in which two communicating entities, a first communicating entity 101 and a second communicating entity 102 are connected. The access network may, e.g., be in the form of a 3GPP radio access network (RAN) or any other type of non-3GPP communication network that may connect to the core network 105.

As the skilled person will realize, communication performed by the first and second communicating entities 101, 102 is enabled by several functional units in both the access network 103 and the core network 105. For the sake of clarity of description, such functional units are not illustrated in full but only schematically represented and exemplified by a network element (NE) 107 that, in a 4G context, may be a mobility management entity (MME), a serving gateway (S-GW), a packet data network gateway (P-GW) etc. In a 5G context, the network element 107 may, e.g., be in the form of a policy control function (PCF), a user data management function (UDM), an Access and Mobility Management Function (AMF) or a session management function (SMF) etc. The network element may even be an SMS-Function (SMSF). A common characteristic of such functional units, as represented by network element 107, in the core network 105 is that they may comprise LI functionality in the form of a point of interception (POI) 135. The POI 135 is in FIG. 1*a* thus depicted as being a part of the network element 107 or being embedded therein, but the POI 135 may also be separate from the network element 107 with which it is associated. The core network 105 may be the core network of a serving network (SN), which may be a Visited Public Land Mobile Network (VPLMN) or a Home Public Land Mobile Network (HPLMN).

The core network 105 also comprises an administrative function (ADMF) 108 and a mediation and delivery function (MDF) 132 that connects to a law enforcement agency (LEA) 131. Within the MDF 132 a mediation function (MF) 133 and a delivery function (DF) 134 are configured to handle an intercept product in the form of intercept related information (IRI) and content of communication (CC) received from the POI 135 and provide the IRI and CC to the LEA 131. The LEA 131 manages a law enforcement monitoring facility (LEMF) 136, which receives IRI and CC from the DF 134.

The ADMF 108, the NE 107 and the LEMF 136 are connected to a QKDN 10. The QKDN 10 may, as the skilled person will realize, comprise a plurality of QKD nodes and relays that are interconnected by QKD links that perform key management. A detailed description of key management and further details with regard to the QKDN 10 is outside the scope of the present disclosure.

As mentioned above, communication between the entities takes place via various LI interfaces. That is, the ADMF 108 communicates with the MF 133, DF 134 and the POI 135 in the NE 107 via the X1 interface. The POI 135 in the NE 107 communicates with the MF 133 via the X2 and X3 interfaces. The ADMF 108 also communicates with the LEMF 136 at the LEA 131 via an HI-1 interface and the DF 134 communicates with the LEMF 136 in the LEA 131 via HI-2 and HI-3 interfaces. Communication with the QKDN 10, by the ADMF 108, the NE 107 and the LEMF 136, may take place via an application programming interface (API) with a respective QKDN controller (not illustrated) in the QKDN 10.

Figure 1B:
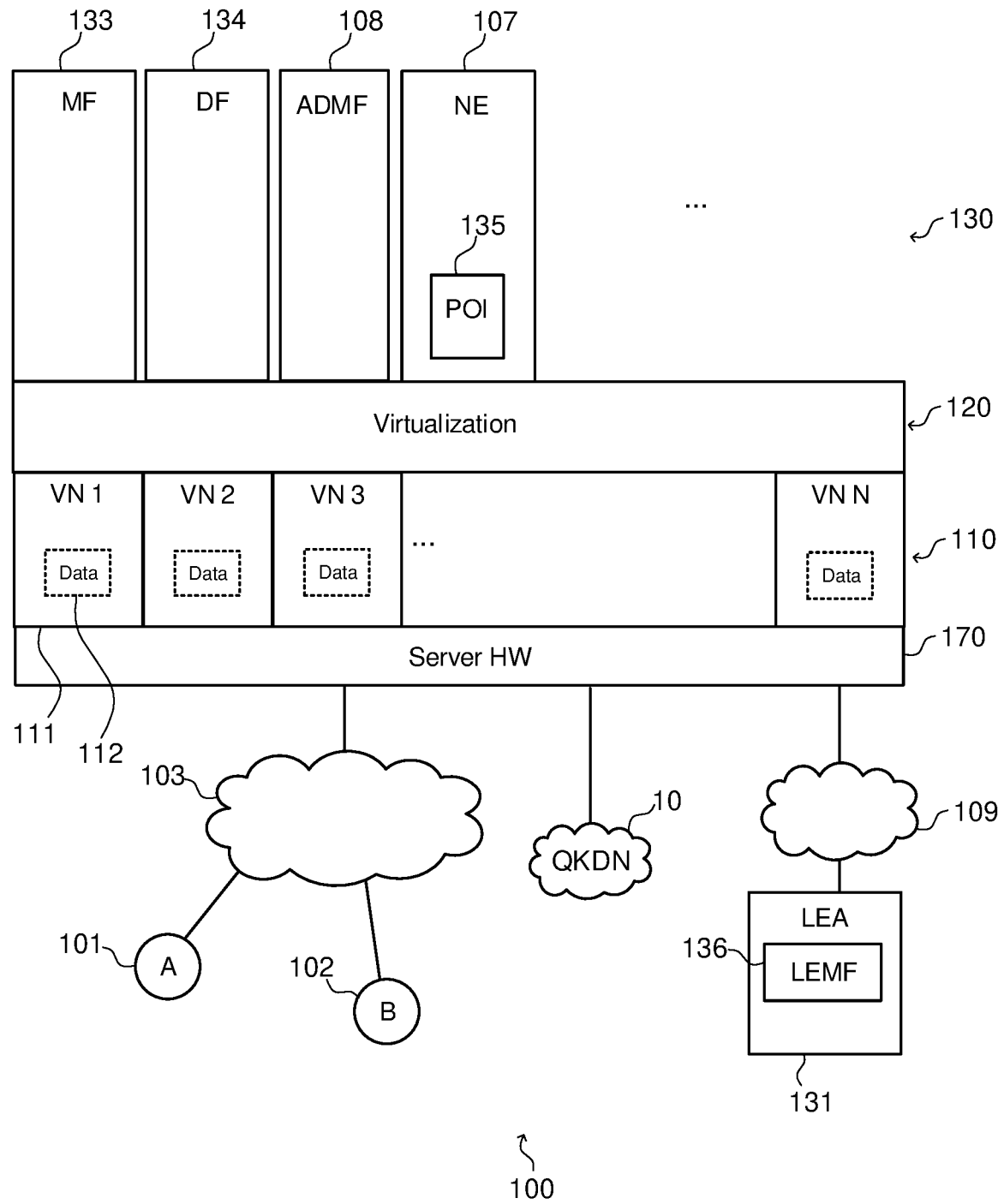

FIG. 1*b* schematically illustrates a second functional representation of the telecommunication network 100. In this second functional representation, the telecommunication network 100 is realized at least in part by virtualized functions that are executed on virtual nodes 110 that utilize a hardware server platform 170. The MF 133, the DF 134, the ADMF 108, the NE 107 and the POI 135 are realized in a functional layer 130 of virtualized network functions (VNF) that execute in the virtual nodes 110 via a virtualization layer 120. For example, a virtual node 111 is a collection of software instructions as well as associated data 112 as the skilled person will realize. The LEA 131 with its LEMF 136 is connected to the hardware platform 170 via an intermediate network 109, the details of which are outside the scope of the present disclosure. Although not explicitly illustrated in FIG. 1*b*, communication between entities via the X1, X2, X3, HI-1, HI-2 and HI-3 interfaces take place as described above in connection with FIG. 1*a*. Similarly, the QKDN 10 is connected to the hardware platform 170 in a manner that is known to the skilled person.

The ADMF 108, the MF 133, the DF 134 and the POI 135 as well as the LEMF 136 may all be embodied as software installed in one or more hardware devices, which all comprise processing and storage resources that are configured to realize and handle LI information as will be exemplified in detail below.

Turning now to FIGS. 2*a-b* and FIGS. 3*a-b*, and with continued reference to FIGS. 1*a-b*, embodiments of methods in the telecommunication network 100 will be described in some more detail. The embodiments will exemplify how the various functional units and interfaces described above may be enhanced in order to provide the effects and advantages as summarized above.

Figure 2A:
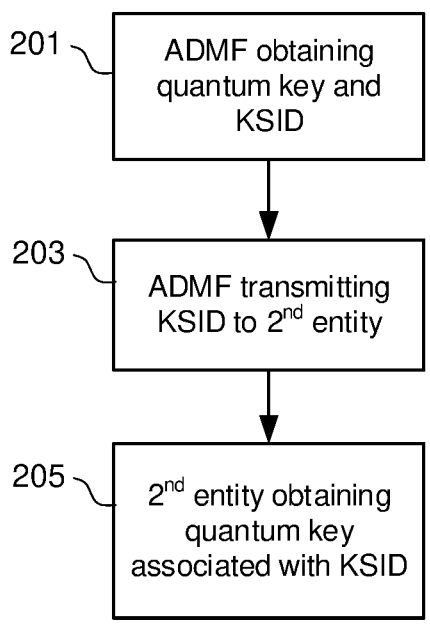
FIGS. 2*a-b* are flowcharts of methods.
Figure 3A:
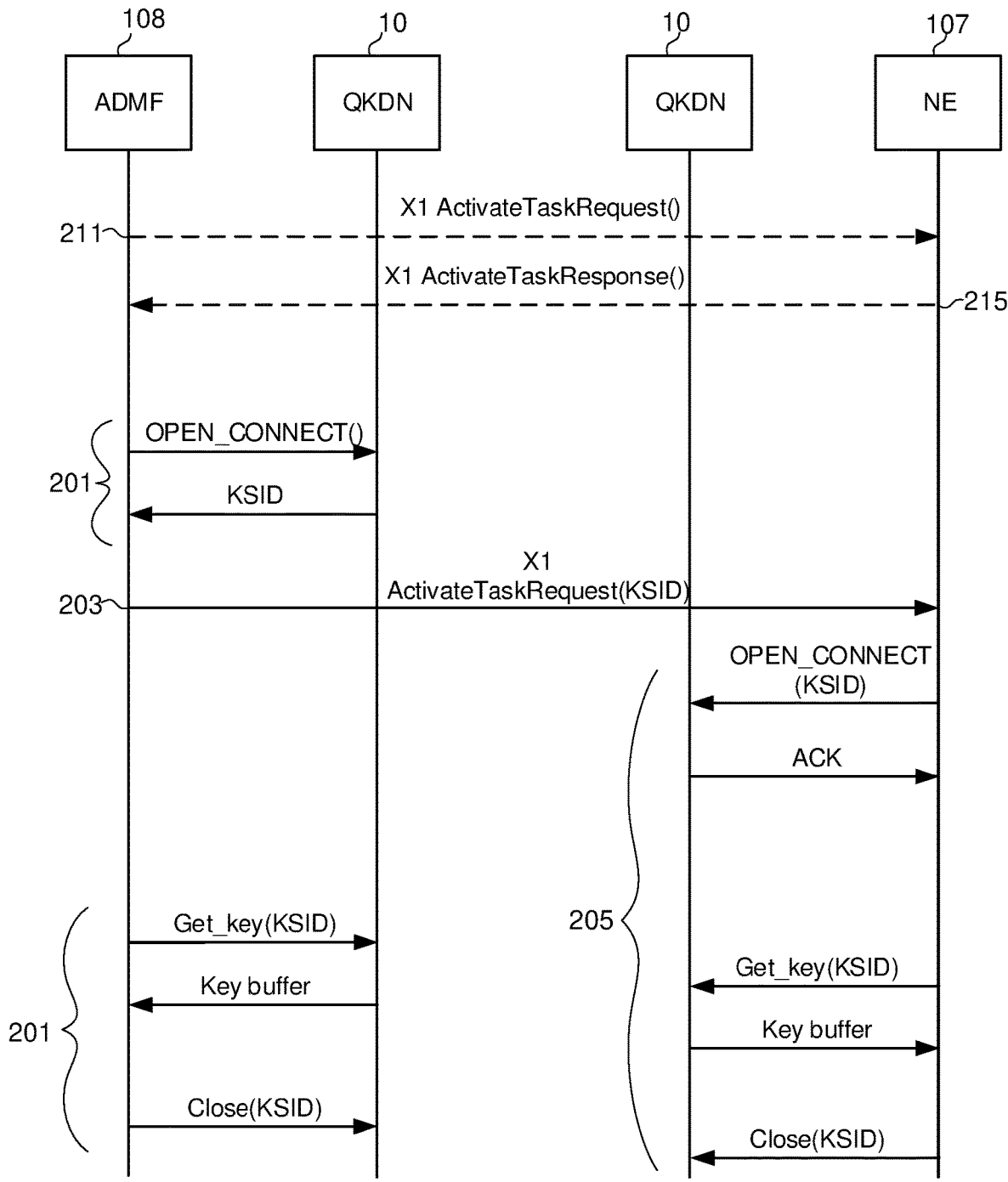
FIGS. 3*a-b* are signaling diagrams illustrating signals transmitted in the methods illustrated in FIGS. 2*a-b*, FIG. 4 schematically illustrates a computer system, and FIG. 5 schematically illustrates a computer system.
Figure 3B:
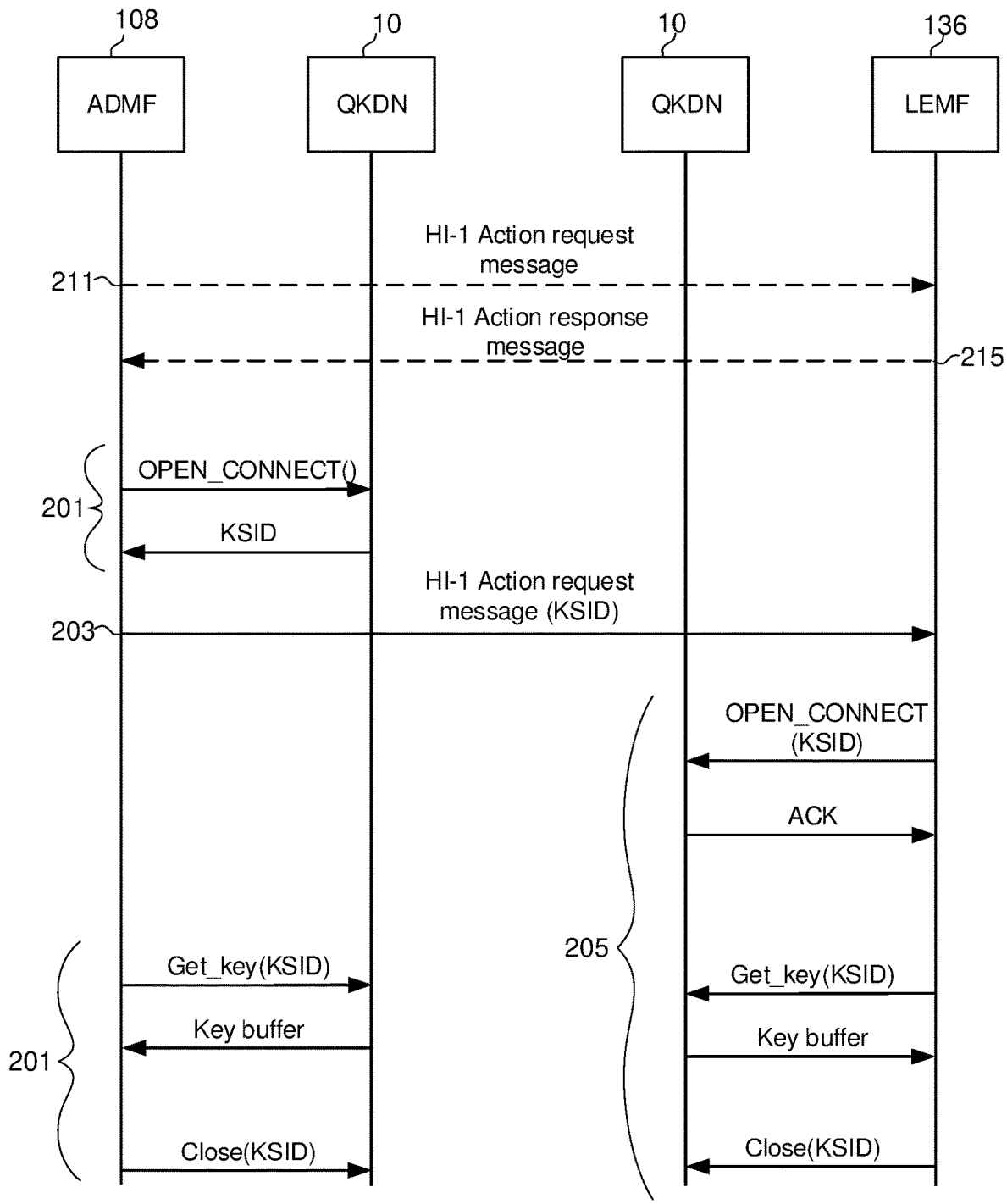

FIG. 2a and FIGS. 3a-b illustrate a method that comprises actions performed by the ADMF 108 and an LI entity, e.g. the NE 107 and the LEMF 136, in the telecommunication network 100 introduced and described above in connection with FIGS. 1a-b:

Action 201

The ADMF 108 obtains a quantum key and a KSID associated with the quantum key from the QKDN 10.

As illustrated in FIGS. 3a-b, the obtaining of the quantum key and KSID in action 201 involves a sequence of transmissions of signals between the ADMF 108 and the QKDN 10 using the API. The sequence of transmissions of signals between the ADMF 108 and the QKDN 10 follows the ETSI QKD application interface API specification GS QKD 004 V2.1.1.

Action 203

The ADMF 108 transmits the KSID associated with the quantum key to an LI entity 107, 136 in the telecommunication network 100. The transmission of the KSID may take place at any time as soon as the KSID has been obtained from the QKDN 10. In FIGS. 3a-b, the transmission of the KSID takes place prior to the obtaining of the quantum key.

As illustrated in FIG. 3a, the LI entity 107, 136 may be the NE 107 in the telecommunication network 100 and the transmission in action 203 of the KSID associated with the quantum key may be performed via an X1 interface as specified by the ETSI in TS 103 221-1. For example, the transmission in action 203 may take place in an ActivateTaskRequest message and the KSID may be a mandatory field among the TaskDetails in the ActivateTaskRequest message.

As illustrated in FIG. 3b, the LI entity 107, 136 may be the LEMF 136 in the telecommunication network 100 and the transmission in action 203 of the KSID associated with the quantum key may be performed via an HI-1 interface as specified by the ETSI in TS 103 120. For example, the transmission in action 203 may be performed via the HI-1 interface in an action request message and the KSID may be a mandatory field in the action request message.

Action 205

Having received the KSID from the ADMF 108, the LI entity 107, 136 then obtains a quantum key associated with the KSID transmitted by the ADMF 108 from the QKDN 10.

As illustrated in FIGS. 3a-b, the obtaining of the quantum key using the received KSID involves a sequence of transmissions of signals between the LI entity 107, 136 and the QKDN 10 using the API. As in action 201, the sequence of transmissions of signals between the ADMF 108 and the QKDN 10 in action 205 follows the ETSI QKD application interface API specification GS QKD 004 V2.1.1. Furthermore, as is understood from ETSI GS QKD 004 V2.1.1, one or more quantum keys may be obtained from a stream of quantum keys using the KSID using repeated Get key messages.

The method illustrated in FIG. 2a can be seen as a "handshake" between the ADMF 108 and the second entity 107, 136 that ensures that subsequent communication of sensitive information can be secured by the use of the quantum key obtained by the ADMF 108 and the second entity 107, 136. As exemplified in FIG. 2a, this "handshake" can be done in a direct manner where the ADMF 108 is certain that the second entity 107, 136 has a connection with the QKDN 10.

Figure 2B:
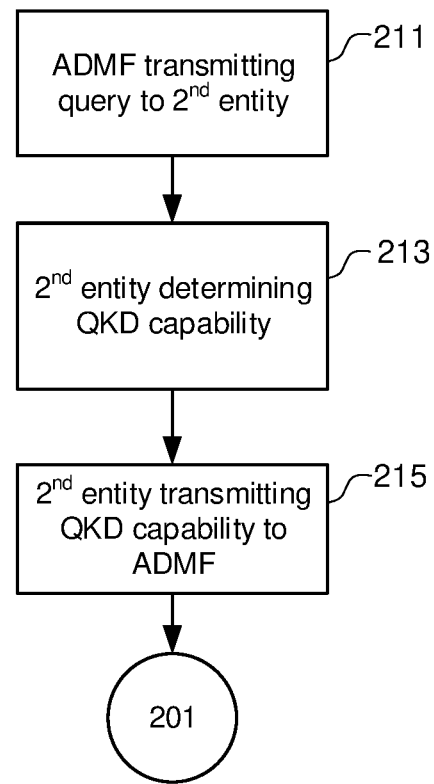

In other scenarios, the ADMF 108 may not know whether or not the second entity 107, 136 has a connection with the QKDN 10 and thereby being able to obtain the one or more quantum keys. In such scenarios, a capability negotiation may be performed in which the ADMF 108 asks the second entity 107, 136 whether or not this capability is available at its end, i.e. whether or not the QKDN 10 is available to the second entity 107, 136, that may be used to obtain the one or more quantum keys. FIG. 2b and FIGS. 3a-b illustrate such a capability negotiation method that comprises actions performed by the ADMF 108 and an LI entity, e.g. the NE 107 and the LEMF 136, in the telecommunication network 100 introduced and described above in connection with FIGS. 1a-b:

Action 211

The ADMF 108 transmits to the LI entity 107, 136 a message comprising a query whether or not the LI entity 107, 136 is capable of obtaining a quantum key from the QKDN 10.

As illustrated in FIG. 3a, the LI entity 107, 136 may be the NE, 107 in the telecommunication network 100 and the transmission 211 by the ADMF 108 to the NE 107 of the query and the transmission 215 by the NE 107 to the ADMF 108 of the response may be performed via an X1 interface as specified by the ETSI in TS, 103 221-1. For example, the transmission 203, by the ADMF 108 to the NE 107, of the query may be performed via the X1 interface in an ActivateTaskRequest message and the query may be a mandatory field among the TaskDetails in the ActivateTaskRequest message. Furthermore, in such examples the transmission 215 by the NE 107 to the ADMF 108 of the response may be performed via an X1 interface in an ActivateTaskResponse message.

As illustrated in FIG. 3b, the LI entity 107, 136 may be the LEMF 136 in the telecommunication network 100 and the transmission 211 by the ADMF 108 to the LEMF 136 of the query and the transmission 215 by the LEMF 136 to the ADMF 108 of the response may be performed via an HI-1 interface as specified by the ETSI in TS 103 120. For example, the transmission 203, by the ADMF 108 to the LEMF 136, of the query may be performed via the HI-1 interface in an action request message and the query may be a mandatory field in the action request message. Furthermore, in such examples the transmission 215 by the LEMF 136 to the ADMF 108 of the response may be performed via an HI-1 interface in an action response message.

Action 213

The LI entity 107, 136 determines that the LI entity 107, 136 is capable of obtaining a quantum key from the QKDN 10.

Action 215

The LI entity 107, 136 then transmits to the ADMF 108 a response comprising information that specifies that the LI entity 107, 136 is capable of obtaining a quantum key from the QKDN 10.

The sequence of actions that begins with the action 201 of obtaining a quantum key and a KSID associated with the quantum key by the ADMF 108 from the QKDN 10 is then performed as a consequence of this receiving, by the ADMF 108 from the second entity 107, 136, in action 215 the information that specifies that the LI entity 107, 136 is capable of obtaining a quantum key from the QKDN 10.

Figure 4:
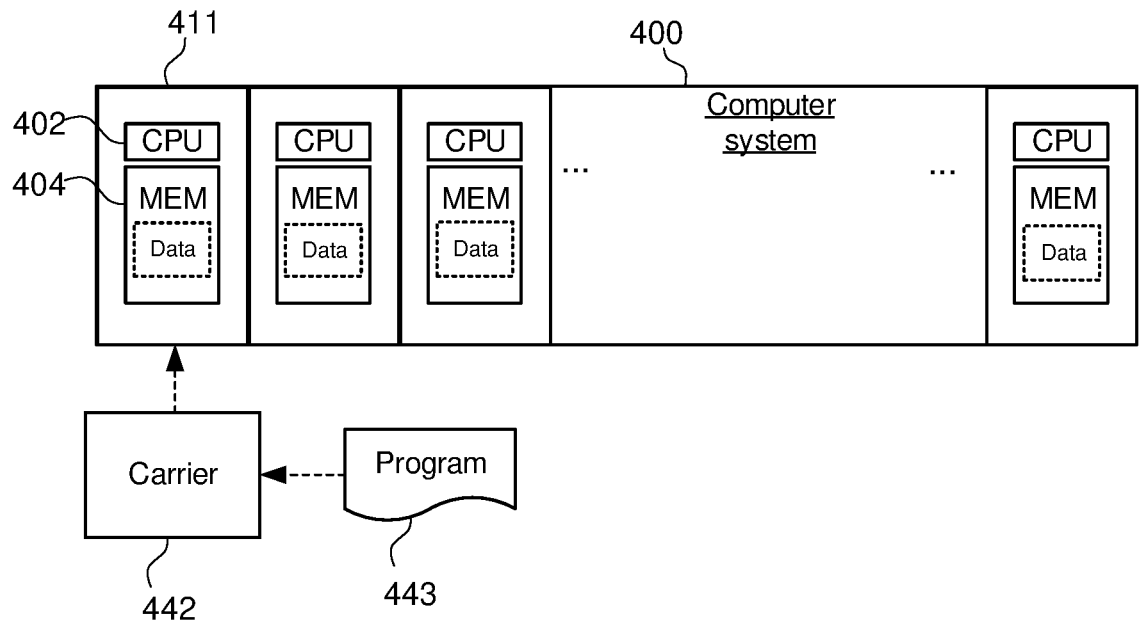

Turning now to FIG. 4, and with continued reference to FIGS. 1-3, a computer system 400 will be described in some detail. The computer system 400, which may correspond to at least part of the telecommunication network 100, comprises a processor 402 and a memory 404. The memory 404 contains instructions executable by the processor 402 whereby the computer system 400 is operative/configured to:

obtain, by a LI ADMF 108, from a QKDN 10, a quantum key and a KSID associated with the quantum key, transmit, by the ADMF 108 to an LI entity 107, 136 in the telecommunication network 100, the KSID associated with the quantum key, and obtain, by the LI entity 107, 136 from the QKDN 10, a quantum key associated with the KSID transmitted by the ADMF 108.

The instructions that are executable by the processor 402 may be software in the form of a computer program 443. The computer program 443 may be contained in or by a carrier 442, which may provide the computer program 443 to the memory 404 and processor 402. The carrier 442 may be in any suitable form including an electronic signal, an optical signal, a radio signal or a computer readable storage medium.

In some embodiments, where the LI entity 107, 136 is a network element, NE, 107 in the telecommunication network 100, the computer system 400 is operative/configured such that the transmission 203, by the ADMF 108 to the NE 107, of the KSID associated with the quantum key is performed via an X1 interface as specified by the European Telecommunications Standards Institute, ETSI, in technical specification, TS, 103 221-1.

In some embodiments, the computer system 400 is operative/configured such that the transmission 203, by the ADMF 108 to the NE 107, of the KSID associated with the quantum key is performed via the X1 interface in an ActivateTaskRequest message and wherein the KSID is a mandatory field among the TaskDetails in the ActivateTaskRequest message.

In some embodiments, the computer system 400 is operative/configured to:

transmit, by the ADMF 108 to the LI entity 107, 136, a message comprising a query whether or not the LI entity 107, 136 is capable of obtaining a quantum key from the QKDN 10, determine, by the LI entity 107, 136, that the LI entity 107, 136 is capable of obtaining a quantum key from the QKDN 10, transmit, by the LI entity 107, 136 to the ADMF 108, a response comprising information that specifies that the LI entity 107, 136 is capable of obtaining a quantum key from the QKDN 10, and operative such that:

the obtaining 201 of a quantum key and a KSID associated with the quantum key by the ADMF 108 from the QKDN 10 is performed as a consequence of receiving, by the ADMF 108 from the second entity 107, 136, the information that specifies that the LI entity 107, 136 is capable of obtaining a quantum key from the QKDN 10.

In some embodiments, where the LI entity 107, 136 is a network element, NE, 107 in the telecommunication network 100, the computer system 400 is operative/configured such that the transmission 211 by the ADMF 108 to the NE 107 of the query and the transmission 215 by the NE 107 to the ADMF 108 of the response is performed via an X1 interface as specified by the ETSI in TS, 103 221-1.

In some embodiments, the computer system 400 is operative/configured such that the transmission 203, by the ADMF 108 to the NE 107, of the query is performed via the X1 interface in an ActivateTaskRequest message and wherein the query is a mandatory field among the TaskDetails in the ActivateTaskRequest message, and the transmission 215 by the NE 107 to the ADMF 108 of the response is performed via an X1 interface in an ActivateTaskResponse message.

In some embodiments, where the LI entity 107, 136 is a law enforcement monitoring facility, LEMF, 136 in the telecommunication network 100, the computer system 400 is operative/configured such that the transmission 203, by the ADMF 108 to the LEMF 136, of the KSID associated with the quantum key is performed via an HI-1 interface as specified by the ETSI in TS 103 120.

In some embodiments, the computer system 400 is operative/configured such that the transmission 203, by the ADMF 108 to the LEMF 136, of the KSID associated with the quantum key is performed via the HI-1 interface in an action request message and wherein the KSID is a mandatory field in the action request message.

In some embodiments, where the LI entity 107, 136 is a LEMF 136 in the telecommunication network 100, the computer system 400 is operative/configured such that the transmission 211 by the ADMF 108 to the LEMF 136 of the query and the transmission 215 by the LEMF 136 to the ADMF 108 of the response is performed via an HI-1 interface as specified by the ETSI in TS 103 120.

In some embodiments, the computer system 400 is operative/configured such that the transmission 203, by the ADMF 108 to the LEMF 136, of the query is performed via the HI-1 interface in an action request message and wherein the query is a mandatory field in the action request message, and the transmission 215 by the LEMF 136 to the ADMF 108 of the response is performed via an HI-1 interface in an action response message.

Figure 5:
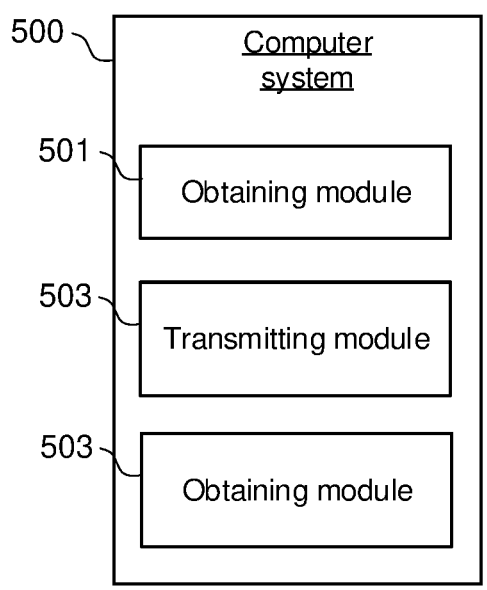

Turning now to FIG. 5, and with continued reference to FIGS. 1-4, a computer system 500 will be described in some detail. The computer system 500 comprises:

an obtaining module 501 configured to obtain, by a LI ADMF 108, from a QKDN 10, a quantum key and a KSID associated with the quantum key, a transmitting module 503 configured to transmit, by the ADMF 108 to an LI entity 107, 136 in the telecommunication network 100, the KSID associated with the quantum key, and an obtaining module 505 configured to obtain, by the LI entity 107, 136 from the QKDN 10, a quantum key associated with the KSID transmitted by the ADMF 108.

The computer system 500 may comprise further modules that are configured to perform in a similar manner as, e.g., a computer system 400 described above in connection with FIG. 4.

The invention claimed is:

1. A method performed by a lawful interception (LI) administrative function (ADMF) in a telecommunication network, the method comprising:

obtaining a quantum key and a key stream identifier (KSID) associated with the quantum key from a quantum key distribution network (QKDN);

transmitting to an LI entity a first request message;

receiving from the LI entity a first response message responsive to the first request message, wherein the first response message indicates that the LI entity is capable of obtaining the quantum key from the QKDN;

determining if the LI entity is capable of obtaining the quantum key from the QKDN; and as a result of determining that the LI entity is capable of obtaining the quantum key from the QKDN, transmitting to the LI entity the KSID associated with the quantum key to enable the LI entity to obtain the quantum key associated with the KSID transmitted by the LI ADMF from the QKDN.

2. The method of claim 1, wherein the LI entity is a network element (NE) in the telecommunication network and wherein the transmission, by the LI ADMF to the NE, of the KSID associated with the quantum key is performed via an X1 interface as specified by the European Telecommunications Standards Institute in technical specification, TS, 103 221-1.

3. The method of claim 2, wherein the transmission, by the LI ADMF to the NE, of the KSID associated with the quantum key is performed via the X1 interface in an ActivateTaskRequest message and wherein the KSID is a mandatory field among the TaskDetails in the ActivateTaskRequest message.

4. The method of claim 1, further comprising:
transmitting, by the LI ADMF to the LI entity, a message comprising a query whether or not the LI entity is capable of obtaining a quantum key from the QKDN;
determining, by the LI entity, that the LI entity is capable of obtaining a quantum key from the QKDN; and
transmitting, by the LI entity to the LI ADMF, a response comprising information that specifies that the LI entity is capable of obtaining a quantum key from the QKDN, wherein
the obtaining of a quantum key and a KSID associated with the quantum key by the LI ADMF from the QKDN is performed as a consequence of receiving, by the LI ADMF from the second entity, the information that specifies that the LI entity is capable of obtaining a quantum key from the QKDN.

5. The method of claim 4, wherein the LI entity is a network element (NE) in the telecommunication network and wherein the transmission by the LI ADMF to the NE of the query and the transmission by the NE to the LI ADMF of the response is performed via an X1 interface as specified by ETSI in TS, 103 221-1.

6. The method of claim 5, wherein:
the transmission, by the LI ADMF to the NE, of the query is performed via the X1 interface in an ActivateTaskRequest message and wherein the query is a mandatory field among the TaskDetails in the ActivateTaskRequest message, and
the transmission by the NE to the LI ADMF of the response is performed via an X1 interface in an ActivateTaskResponse message.

7. The method of claim 1, wherein
the LI entity is a law enforcement monitoring facility (LEMF) in the telecommunication network, and
the transmission, by the LI ADMF to the LEMF, of the KSID associated with the quantum key is performed via an HI-1 interface as specified by ETSI in TS 103 120.

8. The method of claim 7, wherein the transmission, by the LI ADMF to the LEMF, of the KSID associated with the quantum key is performed via the HI-1 interface in an action request message and wherein the KSID is a mandatory field in the action request message.

9. A non-transitory computer readable storage medium storing a computer program comprising instructions which, when executed on at least one processor in a computer system, causes the computer system to carry out the method of claim 1.

10. The method of claim 1, wherein determining if the LI entity is capable of obtaining the quantum key from the QKDN comprises:
transmitting to the LI entity a second message comprising a query whether or not the LI entity is capable of obtaining the quantum key from the QKDN; and
receiving from the LI entity a response comprising information that specifics that the LI entity is capable of obtaining the quantum key from the QKDN.

11. A computer system comprising at least a processor and a memory, the memory containing instructions executable by said processor wherein said computer system is configured to perform a method comprising:
obtaining a quantum key and a key stream identifier (KSID) associated with the quantum key from a quantum key distribution network (QKDN);
transmitting to an LI entity a first request message;
receiving from the LI entity a first response message responsive to the first request message, wherein the first response message indicates that the LI entity is capable of obtaining the quantum key from the QKDN;
determining if the LI entity is capable of obtaining the quantum key from the QKDN; and
as a result of determining that the LI entity is capable of obtaining the quantum key from the QKDN, transmitting to the LI entity the KSID associated with the quantum key to enable the LI entity to obtain the quantum key associated with the KSID transmitted by the LI ADMF from the QKDN.

12. The computer system of claim 11, wherein the LI entity is a network element (NE) in the telecommunication network, operative such that the transmission of the KSID associated with the quantum key is performed via an X1 interface as specified by the European Telecommunications Standards Institute (ETSI) in technical specification (TS) 103 221-1.

13. The computer system of claim 12, operative such that the transmission, by the LI ADMF to the NE, of the KSID associated with the quantum key is performed via the X1 interface in an ActivateTaskRequest message and wherein the KSID is a mandatory field among the TaskDetails in the ActivateTaskRequest message.

14. The computer system of claim 11, wherein the method further comprises:
transmitting to the LI entity a message comprising a query whether or not the LI entity is capable of obtaining a quantum key from the QKDN,
determining that the LI entity is capable of obtaining a quantum key from the QKDN, and
transmitting to the LI ADMF a response comprising information that specifies that the LI entity is capable of obtaining a quantum key from the QKDN, wherein
the obtaining of a quantum key and a KSID associated with the quantum key is performed as a consequence of receiving the information that specifies that the LI entity is capable of obtaining a quantum key from the QKDN.

15. The computer system of claim 14, wherein the LI entity is a network element (NE) in the telecommunication network and operative such that the transmission by the LI ADMF to the NE of the query and the transmission by the NE to the LI ADMF of the response is performed via an X1 interface as specified by ETSI in TS 103 221-1.

16. The computer system of claim 15, wherein
the transmission of the query is performed via the X1 interface in an ActivateTaskRequest message and wherein the query is a mandatory field among the TaskDetails in the ActivateTaskRequest message, and the transmission of the response is performed via an X1 interface in an ActivateTaskResponse message.

17. The computer system of claim 11, wherein the LI entity is a law enforcement monitoring facility (LEMF) in the telecommunication network and operative such that the transmission of the KSID associated with the quantum key is performed via an HI-1 interface as specified by ETSI in TS 103 120.

18. The computer system of claim 17, wherein the transmission of the KSID associated with the quantum key is performed via the HI-1 interface in an action request message and wherein the KSID is a mandatory field in the action request message.

19. A method performed by a lawful interception (LI) entity in a telecommunication network, the method comprising:

receiving from an LI administrative function (ADMF) a first request message;

transmitting to the LI ADMF a first response message responsive to the first request message, wherein the first response message indicates that the LI entity is capable of obtaining quantum keys from a quantum key distribution network (QKDN);

as a result of transmitting the first response message, receiving from the LI ADMF a key stream identifier (KSID) associated with a quantum key;

as a result of receiving the KSID, sending to the QKDN a second request message comprising the KSID; and receiving from the QKDN a second response message responsive to the second request message, wherein the second response message comprises the quantum key associated with the KSID.

* * * * *